United States Patent
Nakamura

(10) Patent No.: US 11,703,450 B2
(45) Date of Patent: Jul. 18, 2023

(54) OPTICAL BEAM CONTROLLER AND OPTICAL INTERFERENCE TOMOGRAPHIC IMAGING DEVICE USING SAME

(71) Applicant: NEC Corporation, Tokyo (JP)

(72) Inventor: Shigeru Nakamura, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/772,684

(22) PCT Filed: Dec. 18, 2018

(86) PCT No.: PCT/JP2018/046447
§ 371 (c)(1),
(2) Date: Jun. 12, 2020

(87) PCT Pub. No.: WO2019/131298
PCT Pub. Date: Jul. 4, 2019

(65) Prior Publication Data
US 2020/0309692 A1    Oct. 1, 2020

(30) Foreign Application Priority Data

Dec. 25, 2017   (JP) .................................. 2017-248229

(51) Int. Cl.
G01N 21/47     (2006.01)
G02B 27/10     (2006.01)
G01N 21/17     (2006.01)

(52) U.S. Cl.
CPC ..... *G01N 21/4795* (2013.01); *G02B 27/1013* (2013.01); *G01N 2021/1787* (2013.01)

(58) Field of Classification Search
None
See application file for complete search history.

(56) References Cited

U.S. PATENT DOCUMENTS

| | | | |
|---|---|---|---|
| 4,748,686 A | | 5/1988 | Glomb |
| 5,716,324 A | * | 2/1998 | Toida .................. A61B 5/0084 356/484 |
| 7,764,384 B1 | * | 7/2010 | Zhao .................. G01B 9/02027 356/486 |
| 8,982,357 B2 | * | 3/2015 | Yoshida ............... A61B 5/0073 356/479 |
| 2002/0037252 A1 | * | 3/2002 | Toida .................... A61B 5/418 424/9.6 |

(Continued)

FOREIGN PATENT DOCUMENTS

| JP | H 07-005101 A | 1/1995 |
|---|---|---|
| JP | H 08-252256 A | 10/1996 |

(Continued)

OTHER PUBLICATIONS

International Search Report dated Mar. 19, 2019, in corresponding PCT International Application.

(Continued)

*Primary Examiner* — Rufus L Phillips

(57) ABSTRACT

An optical beam controller includes: an optical multiple-beam generator generating a plurality of wavelength-swept optical beams; and an optical frequency difference setter setting an optical frequency difference in any combination of the plurality of optical beams in such a way as to be larger than a band of a photodetector that receives an optical beam.

4 Claims, 7 Drawing Sheets

(56) References Cited

U.S. PATENT DOCUMENTS

| | | | |
|---|---|---|---|
| 2008/0117431 A1 | 5/2008 | Teramura | |
| 2011/0051146 A1* | 3/2011 | Jensen | G01B 9/02067 356/493 |
| 2012/0026463 A1 | 2/2012 | Makihira et al. | |
| 2012/0057823 A1* | 3/2012 | Huang | G02B 6/2808 385/51 |
| 2014/0160488 A1 | 6/2014 | Zhou | |
| 2016/0028207 A1* | 1/2016 | Cable | H01S 5/042 372/20 |
| 2016/0370169 A1 | 12/2016 | Zhou | |
| 2017/0023350 A1 | 1/2017 | Balbas et al. | |
| 2020/0166328 A1* | 5/2020 | Zhou | G01B 9/02004 |

FOREIGN PATENT DOCUMENTS

| | | |
|---|---|---|
| JP | 2008-128709 A | 6/2008 |
| JP | 2010-117789 A | 5/2010 |
| JP | 2010-167253 A | 8/2010 |
| JP | 2010-261858 A | 11/2010 |
| JP | 2011-005235 A | 1/2011 |
| JP | 2011-005236 A | 1/2011 |
| JP | 2012-523945 A | 10/2012 |
| JP | 2016-505828 A | 2/2016 |
| WO | WO 2017/013177 A1 | 1/2017 |

OTHER PUBLICATIONS

Extended European Search Report for EP Application No. 18897135.2 dated Jan. 22, 2021.

Wartak Andreas et al: "Sequential multi-channel OCT in the retina using high-speed fiber optic switches" Progress in Biomedical Optics and Imaging, SPIE—International Society for Optical Engineering, Bellingham, WA, US, vol. 10416, Jul. 31, 2017 (Jul. 31, 2017), pp. 1041607_1-1041607_7.

Japanese Office Action for JP Application No. 2021-109351 dated Apr. 19, 2022 with English Translation.

\* cited by examiner

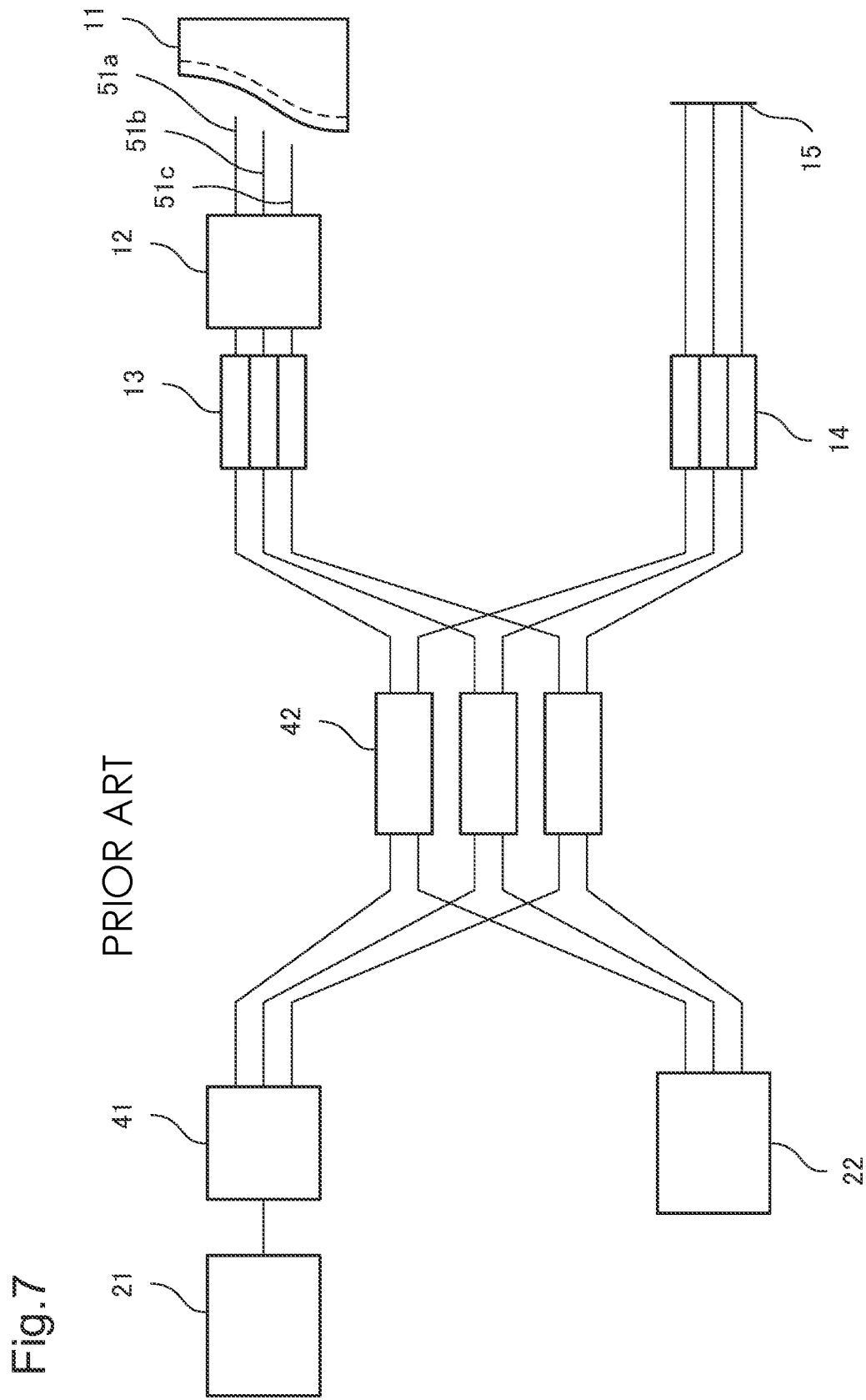

OPTICAL BEAM CONTROLLER AND OPTICAL INTERFERENCE TOMOGRAPHIC IMAGING DEVICE USING SAME

CROSS-REFERENCE TO RELATED PATENT APPLICATIONS

This application is a National Stage Entry of International Application No. PCT/JP2018/046447, filed Dec. 18, 2018, which claims priority from Japanese Patent Application No. 2017-248229, filed Dec. 25, 2017. The entire contents of the above-referenced applications are expressly incorporated herein by reference.

TECHNICAL FIELD

The present invention relates to an optical beam controller that suppresses interference among optical beams when irradiating a measurement object with a plurality of the optical beams, and an optical interference tomographic imaging device that uses the same and thereby performs tomographic imaging on scattered light from an inside of an object by optical coherence tomography (OCT).

BACKGROUND ART

An optical coherence tomography technique of, by using optical interference, highly accurately acquiring three-dimensional structural data of a measurement object irradiated with light enables tomographic observation near a surface of the measurement object, and application to medical diagnosis and industrial product inspection is expanding.

In the OCT, a position of a light scattered point in an optical axis direction, i.e., a depth direction is specified by analyzing a result acquired by causing reference light to interfere with object light to be scattered by irradiating a measurement object with light, thereby acquiring structural data spatially resolved in the depth direction. In many cases, the object light is not reflected 100% only from a surface of a measurement object, and propagates into an inside to some extent, and is then backscattered. Accordingly, the structural data spatially resolved in the depth direction of an inside of the object can be acquired. As the OCT, there are a time domain (TD-OCT) method and a Fourier domain (FD-OCT) method, and the FD-OCT method is more promising in terms of a high speed and high sensitivity. In the FD-OCT method, when the object light and the reference light are caused to interfere with each other, an interference light spectrum in a wide wavelength band is measured, and is subjected to Fourier transform, thereby acquiring the structural data in the depth direction. As a method of acquiring the interference light spectrum, there are a spectral domain (SD-OCT) method using a spectroscope, and a swept source (SS-OCT) method using a light source that sweeps a wavelength.

In the above-described method of acquiring the structural data spatially resolved in the depth direction, three-dimensional structural data can be acquired by irradiating different positions of a measurement object with an object optical beam, and acquiring a structural data spatially resolved in an in-plane direction perpendicular to an optical axis. In order to irradiate different positions of the measurement object with the object optical beam, scanning one object optical beam is usually performed by using a galvano mirror or the like. For this reason, basically, spatial resolution in the in-plane direction is determined by an optical beam diameter, and a range is determined by the number of locations to be irradiated with an optical beam. Therefore, there is a problem that measurement time becomes long when a wide range is measured.

PTL 1 describes the following invention. In FIG. 1 of PTL 1, a broadband optical pulse 5 is input from a broadband optical pulse generation unit 4 to an optical pulse demultiplexing-delay-multiplexing unit 18. An optical multiplexing-demultiplexing device 32 and a plurality of optical delay devices 34 of the unit 18 generate a narrow-band optical pulse train 20 delayed by different time as illustrated in FIG. 6 of PTL 1. The narrow-band optical pulse train 20 is caused to branch by a branching-merging device 42, one branching part is applied to a measurement object 46 and is backscattered, the other branching part is applied to a reference mirror 66, and the returned light is multiplexed by an optical coupler 70. In PTL 1, it is assumed that the measurement object 46 is irradiated with a single object optical beam as illustrated in FIG. 1 of PTL 1, and FIG. 6 of PTL 1 merely illustrates change in wavelength of the single object optical beam with respect to time. In other words, the problem that measurement time becomes long when the above-described wide range is measured is not solved.

In order to cope with such a problem, in a method described in PTL 2 and PTL 3 for example, different positions of a measurement object are simultaneously irradiated with a plurality of object optical beams, and measurement of a wide range is thereby accelerated. FIG. 7 illustrates an example of an SD-OCT method described in PTL 3. A light source 21 emits light having a wide wavelength range of approximately 100 nm. The light emitted from the light source 21 is caused to branch into N pieces (N=3 in FIG. 7) by a splitter 41, and each piece is then split into two pieces by a branching-merging device 42, and the two pieces each become object light and reference light. One piece of the light passes through a collimator 13 and an irradiation optical system 12 including a scan mirror and a lens, and is applied to a measurement object 11. In this example, three object optical beams 51a, 51b, and 51c are simultaneously applied to different positions of the measurement object, and backscattered light (object light) returns to the branching-merging devices 42. The other piece of the light passes through a collimator 14 and a reference light mirror 15, and reflected light from the mirror returns to the branching-merging devices 42 and functions as the reference light. The object light scattered from the measurement object and the reference light reflected by the mirror interfere with each other in the branching-merging devices 42. Acquiring an optical spectrum of the interference light by a spectroscope 22 results in acquisition of structural data in a depth direction at an object light irradiation position of the measurement object.

CITATION LIST

Patent Literature

[PTL 1] Japanese Unexamined Patent Application Publication No. 2010-117789
[PTL 2] Japanese Unexamined Patent Application Publication No. H8-252256
[PTL 3] Japanese Unexamined Patent Application Publication No. 2010-167253

SUMMARY OF INVENTION

Technical Problem

In the configuration of FIG. 7, a measurement target area is divided, and, to one divided area, one object optical beam is allocated and applied. Thereby, at a location where the areas are adjacent to each other, the object beams overlap with each other and interference occurs. When interference between the object optical beams occurs, it becomes difficult to acquire structural data with high accuracy. When a measurement object is irradiated with a plurality of object optical beams, control for suppressing influence of interference is necessary.

An object of the present invention is to provide an optical beam controller that applies a plurality of optical beams while suppressing influence of mutual interference among the optical beams, and an optical interference tomographic imaging device that uses the same and enables highly accurate measurement of a measurement target.

Solution to Problem

In order to accomplish the above-described object, an optical beam controller according to the present invention includes: an optical multiple-beam generation means for generating a plurality of wavelength-swept optical beams; and an optical frequency difference setting means for setting an optical frequency difference in any combination of the plurality of optical beams in such a way as to be larger than a band of a photodetector that receives an optical beam.

An optical interference tomographic imaging device according to the present invention includes: the optical beam controller; a branching means for causing a plurality of optical beams from the optical beam controller to branch into object light and reference light; and an irradiation means for irradiating a measurement object with a plurality of the object light beams; and an interference means for causing object light scattered from the measurement object and the reference light to interfere with each other and to be guided to a photodetector.

An optical beam control method according to the present invention includes: generating a plurality of wavelength-swept optical beams; and setting an optical frequency difference in any combination of the plurality of optical beams in such a way as to be larger than a band of a photodetector that receives an optical beam.

Advantageous Effects of Invention

According to the present invention, influence of optical interference among a plurality of object optical beams does not appear in photoelectric conversion output of a photodetector. Thereby, the optical interference tomographic imaging device can measure a measurement target with high accuracy.

BRIEF DESCRIPTION OF DRAWINGS

FIG. 7 is a diagram illustrating a configuration of an optical interference tomographic imaging device in PTL 2.

EXAMPLE EMBODIMENT

First Example Embodiment

Figure 1:
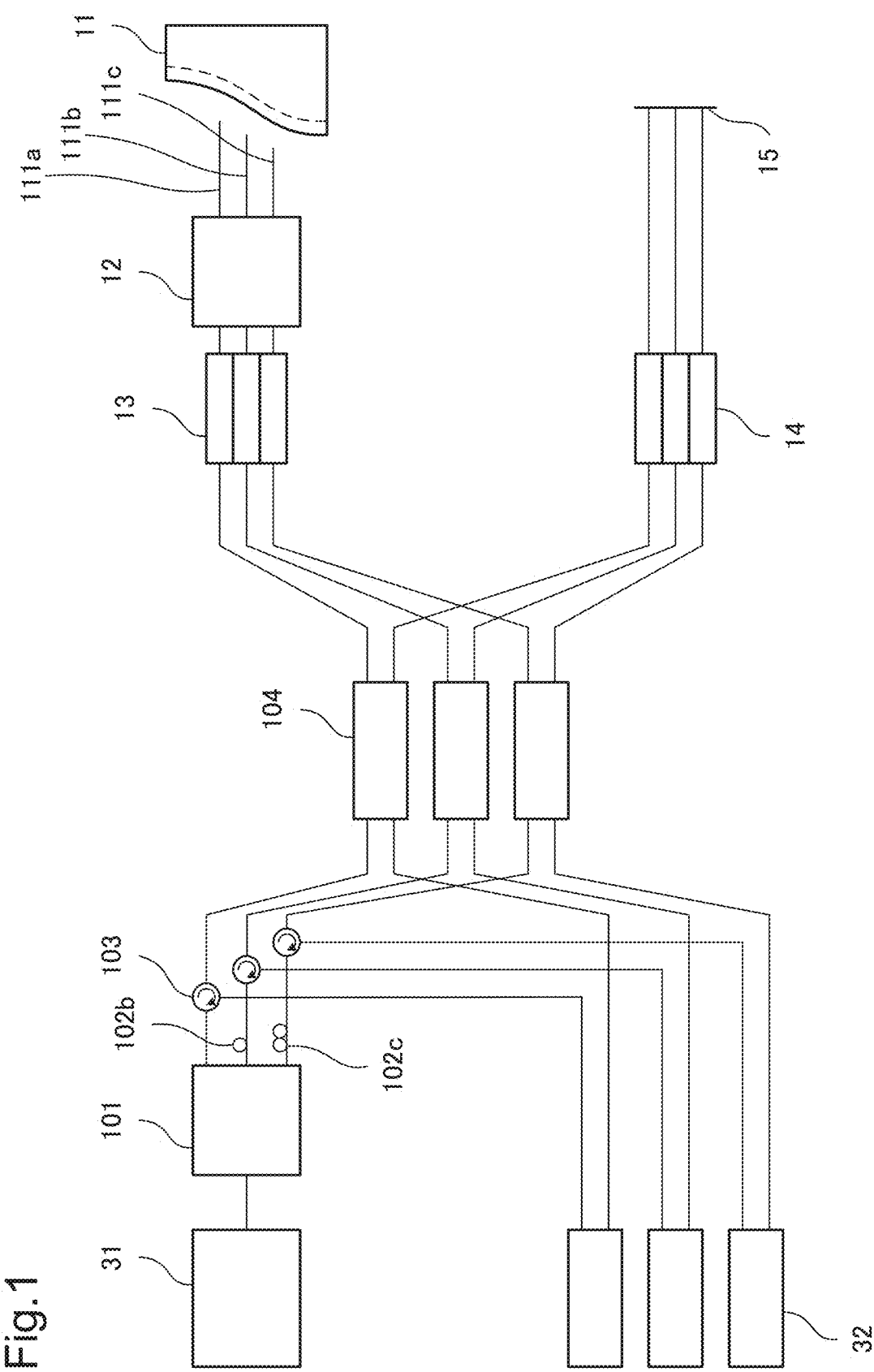
FIG. 1 is a diagram illustrating a configuration according to a first example embodiment of the present invention.

The following describes a first example embodiment of the present invention. FIG. 1 is a diagram illustrating a configuration example of an optical beam controller and an optical interference tomographic imaging device using the same, based on an SS-OCT method according to the first example embodiment.

A wavelength-sweep light source 31 (hereinafter, abbreviated as a light source 31) is a laser that emits light while sweeping a wavelength, and an optical output wavelength thereof changes almost linearly with respect to time in a period of 5 μs, i.e., a wavelength change amount per unit time is constant. The wavelength is swept in a predetermined to wavelength range. According to the present example embodiment, the wavelength is swept from 1250 nm to 1350 nm. A repeat frequency of the wavelength sweep is 100 kHz. The light source 31 may be included in the optical beam controller, or may be provided externally and not included in the optical beam controller.

A control mechanism for generating, from the laser light output, a plurality of optical beams to be applied to a measurement object is provided. In other words, light emitted from the light source 31 is caused to branch into N pieces (N=3 in FIG. 1) by a splitter 101, and then, a time difference is caused to occur among each piece. In this example, a time delay of 3 ns is given by a delay device 102b to piece of the light passing through a branch 101b, as compared to piece of the light passing through a branch 101a that does not give a delay. A time delay of 6 ns is given by a delay device 102c to piece of the light passing through a branch 101c, as compared to the piece of the light passing through the branch 101a that does not give a delay.

After being caused to branch and given time delays, each piece of the light passes through a circulator 103, and is divided into object light and reference light by a branching-merging device 104. A branching ratio between the object light and the reference light is desirably 1:1. As the branching-merging device, a device using fiber fusion, a device using micro-optics, or the like can be used.

The object light passes through a fiber collimator 13 (hereinafter, abbreviated as a collimator) and an irradiation optical system 12 including a scan mirror and a lens, and is applied to a measurement object 11. In this example, three object optical beams 111a, 111b, and 111c are applied to different positions of the measurement object, and each piece of backscattered light returns to the branching-merging device 104.

Meanwhile, the reference light into which the light has branched by the branching-merging devices 104 passes through a collimator 14 and a reference light mirror 15, and each piece of reflected light from the mirror returns to the branching-merging device 104. In the branching-merging device 104, the object light scattered from the measurement object and the reference light reflected by the mirror interfere with each other, and interference light is acquired. One piece of the interference light that has passed through the branching-merging device 104 is input to a two-input balanced photodetector 32 via the circulator 103, and the other piece of the interference light is input directly to the two-input balanced photodetector 32. The balanced photodetector is a photodetector in which two photodiodes are connected in series and the connection is an output (differential output), and an existing photodetector can be used. A band of the balanced photodetector 32 according to the present example embodiment is equal to or lower than 1 GHz.

According to the present example embodiment, the light branches into three pieces by the splitter 101, and thus, three sets of the object light and the reference light exist, and in each set, an optical path length of the object light and an optical path length of the reference light from the branching by the branching-merging device 104 to the re-merging are set in such a way as to be substantially equal to each other. When the optical path lengths differ from each other, a frequency difference (wavelength difference) between the object light and the reference light occurs, and this frequency difference is set to be smaller than a band of photoelectric conversion in the photodetector.

From photoelectric conversion output of the interference light by the balanced photodetector in response to wavelength sweep, an interference light spectrum is acquired, and structural data in a depth direction at an object light irradiation position of the measurement object are acquired.

The following describes a reason why, according to the present example embodiment, influence of optical interference among a plurality of object optical beams does not appear in photoelectric conversion output of the photodetector.

Generally, an amplitude and a phase when a plurality of optical beams overlap with one another are represented by linear superposition of the amplitude and the phase of each optical beam. A considered case is one where at a certain time point t, an object optical beam having a frequency $v_1$ (a wavelength $\lambda_1 = c/v_1$, c: a light velocity) and an object optical beam having a frequency $v_2$ (wavelength $\lambda_2 = c/v_2$) overlap with each other, interfere with reference light having a frequency $v_R$ (wavelength $\lambda_R = c/v_R$), and are subjected to photoelectric conversion by the photodetector. Usually, noise in photoelectric conversion output at the photodetector is reduced by increasing a reference light intensity, and in this case, interference between the object light of the frequency $v_1$ and the reference light of the frequency $v_R$, and interference between the object light of the frequency $v_2$ and the reference light of the frequency $v_R$ may be mainly considered. Accordingly, a term changing according to the following expressions (1) and (2) appears in an instantaneous light intensity of the interference light.

$$e^{i2\pi(v_1 - v_R)t} \quad \text{Expression (1):}$$

$$e^{i2\pi(v_2 - v_R)t} \quad \text{Expression (2):}$$

In the expressions (1) and (2), t is a time point. Whether a signal having been subjected to photoelectric conversion by the photodetector is affected by the changing terms (1) and (2) depends on a magnitude relation between a band $\Delta v$ of the photodetector and each of $v_1 - v_R$ and $v_2 - v_R$.

In the case of intending to acquire structural data at a position a irradiated with the object light of the frequency $v_1$, an interference light spectrum reflecting a tomographic structure of a measurement target can be detected by a signal subjected to photoelectric conversion by the photodetector when v1 is adjusted to satisfy the expression (3):

$$v_1 - v_R \ll \Delta v \quad (3).$$

However, when in this signal, influence of another position b (usually, an adjacent position) irradiated with the object light of the frequency $v_2$ appears, a signal reflecting a structure in a depth direction at the position b is superimposed on the signal reflecting the structure in a depth direction at the position a. In order to avoid this, according to the present example embodiment, the expression (4) is set:

$$v_2 - v_R \gg \Delta v \quad (4).$$

Thereby, appearance of influence of the structure in the depth direction at the position b can be avoided. While only the relation between the two optical beams of the frequencies $v_1$ and $v_2$ is described above in this example, optical frequency difference in any combination of a plurality of optical beams used in measurement may be set in such a way as to satisfy the expression (4), i.e., to become larger than a band of the photodetector.

Figure 2:
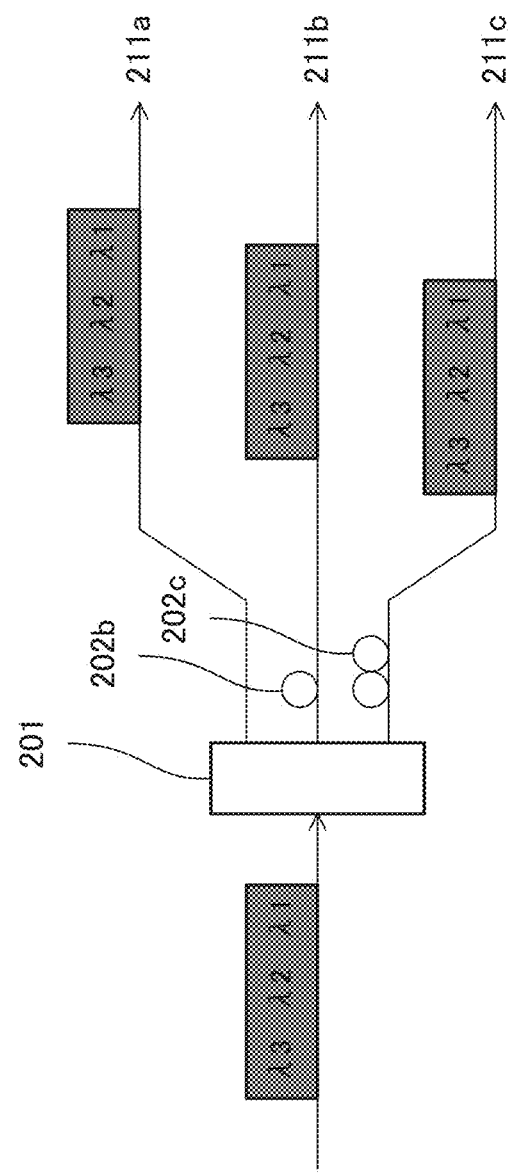
FIG. 2 is a diagram illustrating a characteristic of an optical beam controller according to the first example embodiment of the present invention.

Next, a specific method for setting of $v_2 - v_R \gg \Delta v$ is described with reference to FIG. 2.

Light of which wavelength is swept from $\lambda 1 = 1250$ nm to $\lambda 3 = 1350$ nm almost linearly with respect to time in a period of 5 μs is caused to branch into three pieces by a splitter 201, and as compared to a first optical beam 211a, a second optical beam 211b is given a delay of 3 ns by passing through a delaying device 202b, and a third optical beam 211c is given a delay of 6 ns by passing through a delaying device 202c.

Accordingly, from a wavelength of the first optical beam 211a, a wavelength of the second optical beam 211b is shifted by approximately 0.06 nm, and a wavelength of the third optical beam 211c is shifted by approximately 0.12 nm. This is based on the following calculation. Since a wavelength changes by 100 nm (=1350 nm−1250 nm) in 5 μs, a wavelength changes by 0.02 nm in 1 ns. (0.02 nm=1 ns×100 nm/5 μs). Accordingly, when the wavelength of the first optical beam 211a is λ, at a certain time point, the second optical beam 211b is delayed by 3 ns, and thus, the wavelength of the second optical beam 211b is λ−0.02 [nm/ns]×3 [ns]=λ−0.06 [nm]. Similarly, the third optical beam is delayed by 6 ns, and thus, the wavelength thereof is λ−0.02 [nm/ns]×6 [ns]=λ−0.12 [nm].

As a result, a beat frequency to be generated by interference between the first optical beam 211a and the second optical beam 211b. i.e., the above-mentioned $v_1 - v_R$ is approximately 10 GHz, and a beat frequency to be generated by interference between the second optical beam 211b and the third optical beam 211c is also approximately 10 GHz. These beat frequencies are higher than the band, i.e., the above-mentioned $\Delta v$ of the photodetector, and thus, do not appear in photoelectric conversion output of the photodetector. In other words, influence of the optical interference among a plurality of object optical beams does not appear in photoelectric conversion output of the photodetector, and highly accurate measurement is enabled.

According to the present example embodiment, for example, ten object optical beams can be applied simultaneously, i.e., applied to a wide range, and measurement time can be reduced to 1/10.

Second Example Embodiment

Figure 3:
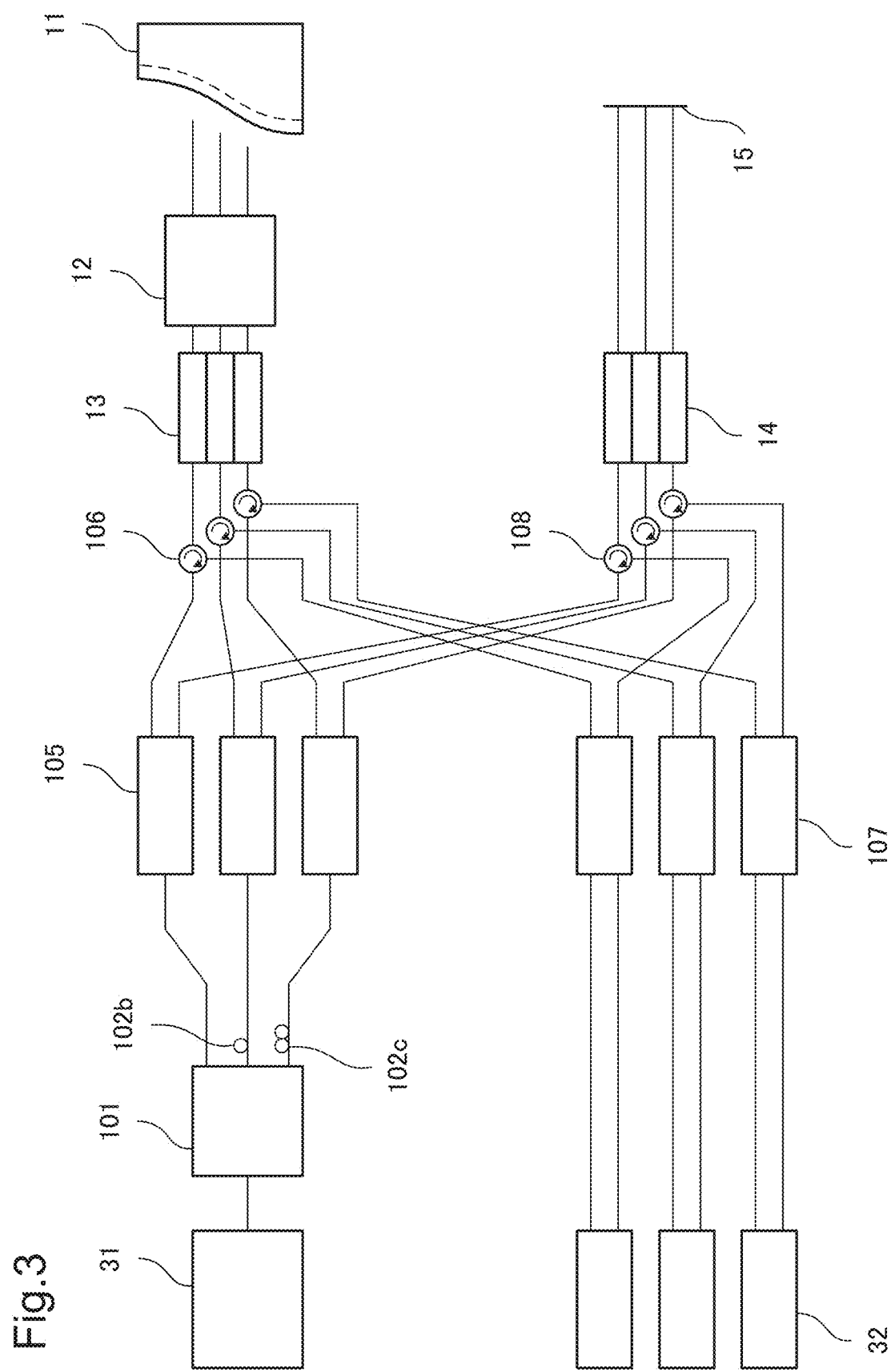
FIG. 3 is a diagram illustrating a configuration according to a second example embodiment of the present invention.

The following describes a second example embodiment of the present invention. FIG. 3 is a diagram illustrating a configuration example of an optical interference tomographic imaging device based on an SS-OCT method according to the second example embodiment. According to the first example embodiment, separation and interference of object light and reference light are performed by the same branching-merging device 104, but according to the present example embodiment, branching of object light and reference light is performed by a branching device 105, and merging of the object light and the reference light and branching of after-merged interference light for input to a balanced photodetector is performed by a branching/merging device 107. Also according to the present example embodiment, a splitter 101 performs branching into three pieces, and thus, three sets of the object light and the reference light exist, and in each set, an optical path length of the object light and an optical path length of the reference light from the branching by the branching device 105 to the re-merging are set in such a way as to be substantially equal to each other. When the optical path lengths differ from each other, a frequency difference (wavelength difference) between the object light and the reference light occurs, and this frequency difference is set to be smaller than a band of photoelectric conversion in the photodetector.

A light source 31 is the same as that used in the first example embodiment and is a laser that emits light whose wavelength is swept, and an optical output wavelength thereof changes almost linearly with respect to time in a period of 5 μs and is swept from 1250 nm to 1350 nm. A repeat frequency of the wavelength sweep is 100 kHz.

A control mechanism for generating, from the laser light output, a plurality of optical beams to be applied to a measurement object is provided. In other words, light emitted from the light source 31 is caused to branch into N pieces (N=3 in FIG. 3) by the splitter 101, and then, a different time delay is given to each piece. In this example, a time delay of 3 ns is given by 102*b*, and a time delay of 6 ns is given by 102*c*.

After being caused to branch and given time delays, each piece of the light is divided into object light and reference light by the branching device 105. The object light passes through a circulator 106, a collimator 13, and an irradiation optical system 12 including a scan mirror and a lens, and is applied to a measurement object 11. In this example, three object optical beams are applied to different positions of the measurement object, and each piece of backscattered light passes through the circulator 106 and is thereby guided to the branching-merging device 107. Meanwhile, the reference light passes through a circulator 108 and a collimator 14 and passes via a reference light mirror 15, and each piece of reflected light from the mirror passes through the circulator 108 and thereby returns to the branching-merging device 107. The object light scattered from the measurement object and the reference light reflected by the mirror interfere with each other in the branching-merging device 107. Interference light that has passed through the branching-merging device 107 is input to a two-input balanced photodetector 32. A band of the balanced photodetector is equal to or lower than 1 GHz. An interference light spectrum is acquired from photoelectric conversion output of the interference light by the balanced photodetector in response to wavelength sweep, and from the interference light spectrum, structural data in a depth direction at an object light irradiation position of the measurement object are acquired. Because of provision of the optical beam control mechanism, influence of optical interference among a plurality of object optical beams does not appear in photoelectric conversion output of the photodetectors.

According to the present example embodiment, branching into the object light and the reference light is performed by the branching device 105, and merging is performed by the branching-merging unit 107. In other words, branching and merging are performed by the different devices, and thus, a branching ratio can be set separately. Separate setting of branching ratios can reduce optical power loss. In many cases, in the branching device 105, the branching ratio is set in such a way that a light intensity of the object light becomes higher. In the branching-merging device 107, the branching ratio is set to 1:1 in consideration of input to the balanced photodetector 32. As the branching device and the branching-merging device, a device using fiber fusion, a device using micro-optics, or the like is considered.

Third Example Embodiment

Figure 4:
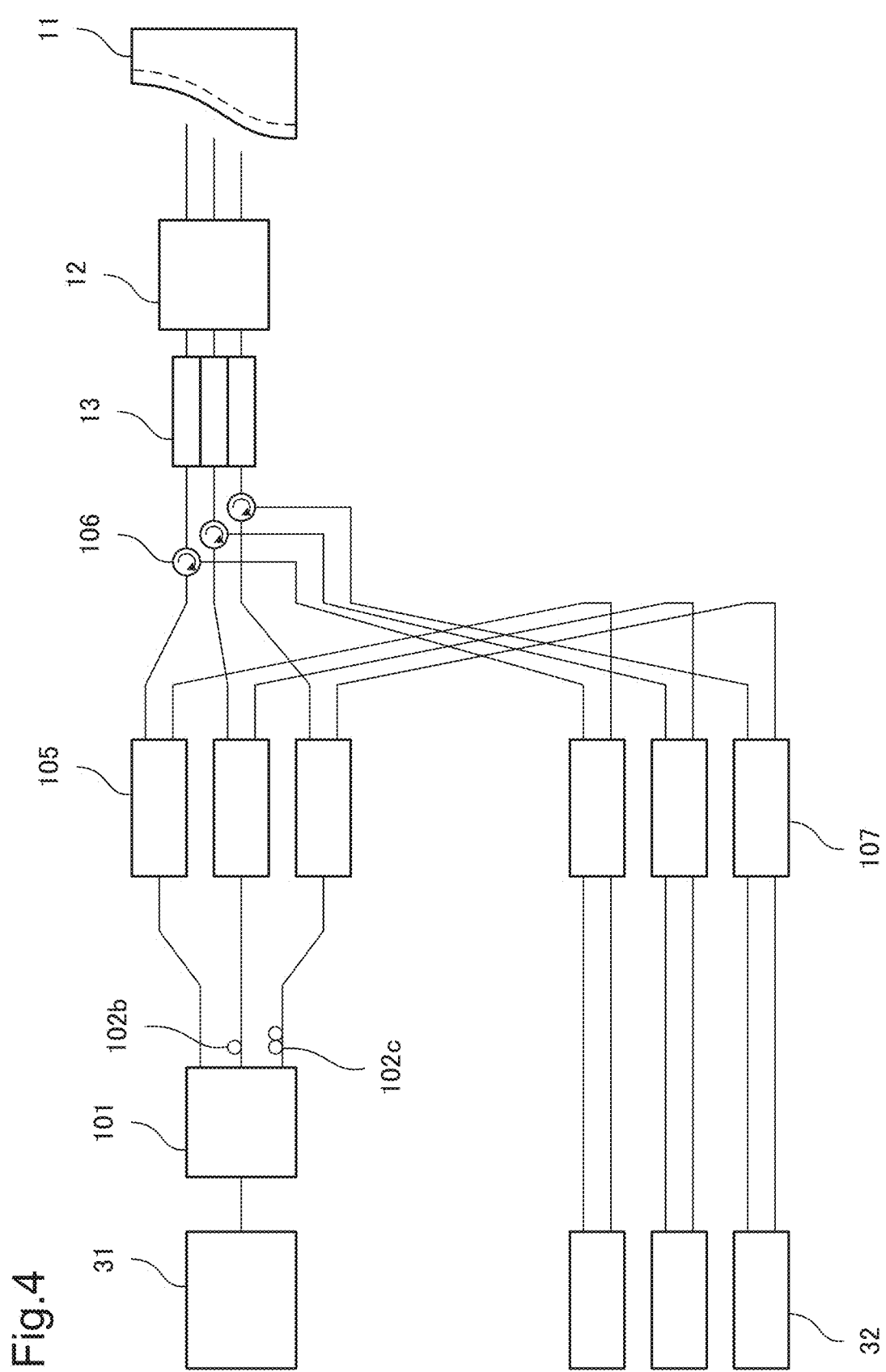
FIG. 4 is a diagram illustrating a configuration according to a third example embodiment of the present invention.

The following describes a third example embodiment of the present invention. FIG. 4 is a diagram illustrating a configuration example of an optical interference tomographic imaging device based on an SS-OCT method according to the third example embodiment. One of pieces into which light branches by a branching device is guided as reference light to a branching-merging device, without using a reference light mirror. Also according to the present example embodiment, a splitter 101 performs branching into three pieces, and thus, three sets of object light and reference light exist, and in each set, an optical path length of the object light and an optical path length of the reference light from the branching by a branching device 105 to the re-merging are set in such a way as to be substantially equal to each other. When the optical path lengths differ from each other, a frequency difference (wavelength difference) between the object light and the reference light occurs, and this frequency difference is set to be smaller than a band of photoelectric conversion in a photodetector.

A light source 31 is the same as that used in the first example embodiment and is a laser that emits light whose wavelength is swept, and an optical output wavelength thereof changes almost linearly with respect to time in a period of 5 μs and is swept from 1250 nm to 1350 nm. A repeat frequency of the wavelength sweep is 100 kHz.

A control mechanism for generating, from the laser light output, a plurality of optical beams to be applied to a measurement object is provided. In other words, light emitted from the light source 31 is caused to branch into N pieces (N=3 in FIG. 4) by the splitter 101, and then, a different time delay is given to each piece. In this example, a time delay of 3 ns is given by 102*b*, and a time delay of 6 ns is given by 102*c*.

After being caused to branch and given time delays, each piece of the light is divided into object light and reference light by the branching device 105. The object light passes through a circulator 106, a collimator 13, and an irradiation optical system 12 including a scan mirror and a lens, and is applied to a measurement object 11. In this example, three object optical beams are applied to different positions of the measurement object, and each piece of backscattered light passes through the circulator 106 and is thereby guided to a branching-merging device 107. Meanwhile, the reference light is guided from the branching device 105 to the branching-merging device 107. The object light scattered from the measurement object and the reference light guided from the branching device 105 interfere with each other in the branching-merging device 107. Interference light that has passed through the branching-merging device 107 is input to a two-input balanced photodetector 32. A band of the balanced photodetector is equal to or lower than 1 GHz. An interference light spectrum is acquired from photoelectric conversion output of the interference light by the balanced photodetector in response to wavelength sweep, and structural data in a depth direction at an object light irradiation position of the measurement object are acquired. Because of provision of the optical beam control mechanism, influence of optical interference among a plurality of object optical beams does not appear in photoelectric conversion output of the photodetectors. According to the present example embodiment, connection from the branching to the merging is made without use of returning by the reference light mirror, and circulators are unnecessary, resulting in simplicity of the configuration. However, adjustment of optical path lengths takes some time, as compared to the first and second example embodiments.

Fourth Example Embodiment

Figure 5:
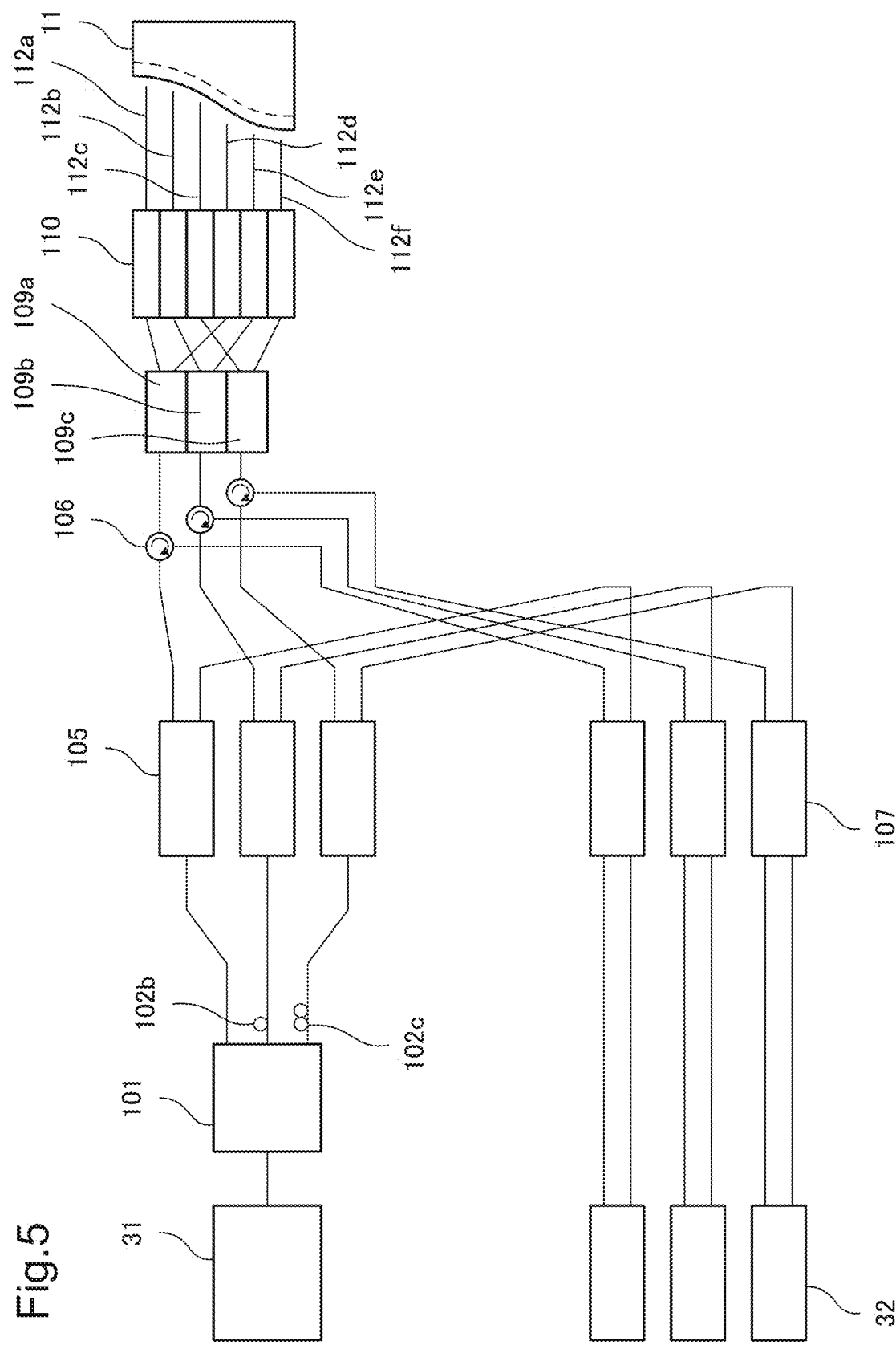
FIG. 5 is a diagram illustrating a configuration according to a fourth example embodiment of the present invention.

The following describes a fourth example embodiment of the present invention. FIG. 5 is a diagram illustrating a configuration example of an optical interference tomographic imaging device based on an SS-OCT method according to the fourth example embodiment. According to the present example embodiment, the collimator 13 and the irradiation optical system 12 of the third example embodiment are replaced with an optical switch 109 and an associated collimator 110. Also according to the present example embodiment, a splitter 101 performs branching into three pieces, and thus, three sets of object light and reference light exist, and in each set, an optical path length of the object light and an optical path length of the reference light from the branching by a branching device 105 to the re-merging are set in such a way as to be substantially equal to each other. When the optical path lengths differ from each other, a frequency difference (wavelength difference) between the object light and the reference light occurs, and this frequency difference is set to be smaller than a band of photoelectric conversion in a photodetector.

A light source 31 is the same as that used in the first example embodiment and is a laser that emits light whose wavelength is swept, and an optical output wavelength thereof changes almost linearly with respect to time in a period of 5 µs and is swept from 1250 nm to 1350 nm. A repeat frequency of the wavelength sweep is 100 kHz.

A control mechanism for generating, from the laser light output, a plurality of optical beams to be applied to a measurement object is provided. In other words, light emitted from the light source 31 is caused to branch into N pieces (N=3 in FIG. 5) by the splitter 101, and then, a different time delay is given to each piece. In this example, a time delay of 3 ns is given by 102b, and a time delay of 6 ns is given by 102c.

After being caused to branch and given time delays, each piece of the light is divided into object light and reference light by the branching device 105. The object light passes through a circulator 106, the optical switches 109a to 109c, and the collimator 110, and is applied to a measurement object 11. In this example, three object optical beams are applied to different positions of the measurement object, and the object optical beams are switched by the optical switches. The optical switch 109a is used for switching between an optical beam 112a and an optical beam 112d to be applied to a location separated therefrom to a small extent. Similarly, the optical switch 109b is used for switching between an optical beam 112b and an optical beam 112e. Similarly, the optical switch 109c is used for switching between an optical beam 112c and an optical beam 112f. Each piece of backward scattered light from the measurement object passes through the circulators 106, and is thereby guided to the branching-merging device 107.

Meanwhile, the reference light is guided from the branching device 105 to branching-merging device 107. The object light scattered from the measurement object and the reference light guided from the branching device 105 interfere with each other in the branching-merging device 107. Interference light that has passed through the branching-merging device 107 is input to a two-input balanced photodetectors 32. A band of the balanced photodetector is equal to or lower than 1 GHz. An interference light spectrum is acquired from photoelectric conversion output of the interference light by the balanced photodetector in response to wavelength sweep, and structural data in a depth direction at an object light irradiation position of the measurement object are acquired. Because of provision of the optical beam control mechanism, influence of optical interference among a plurality of object optical beams does not appear in photoelectric conversion output of the photodetectors. According to the present example embodiment, the optical switches are also used for switching of the optical beams, and thereby, on the measurement object, positions irradiated with object optical beams can be changed over a wide range at a higher speed.

Examples that can be used as the optical switches 109a, 109b, and 109c in FIG. 5 include a waveguide type optical switch that can switch optical paths at a relatively high speed. Assuming that an optical pulse to be output while a wavelength is swept is repeated in 10 µs (repeated at 100 kHz) and has a pulse width of 5 µs for example, when optical paths can be switched in 5 µs that is an interval between the optical pulses, object optical beams can be applied to different positions without wasting optical pulses. Examples of the waveguide type optical switch that can achieve switching time of approximately 5 µs include an optical switch of a silicon waveguide.

Fifth Example Embodiment

Figure 6:
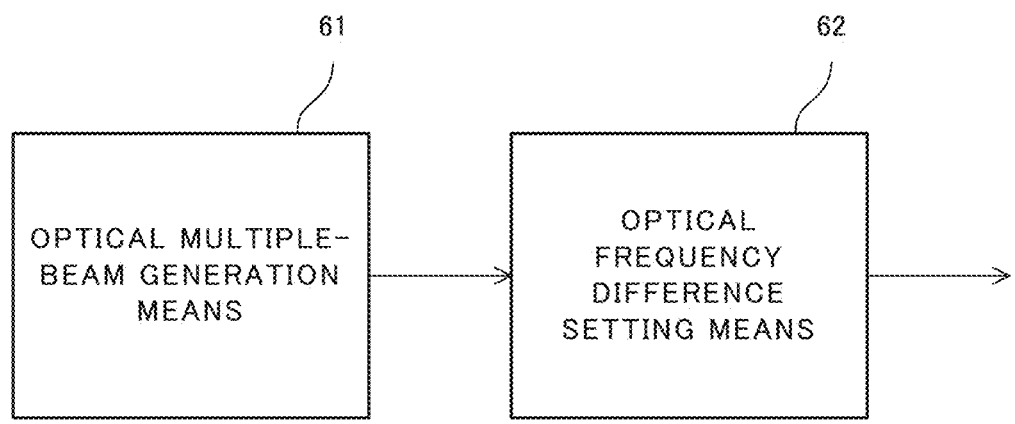
FIG. 6 is a diagram illustrating a configuration of an optical beam controller according to a fifth example embodiment of the present invention.

FIG. 6 is a diagram illustrating an optical beam controller according to a fifth example embodiment of the present invention. An optical beam controller 60 according to the present example embodiment includes an optical multiple-beam generation means 61 for generating a plurality of wavelength-swept optical beams and an optical frequency difference setting means 62 for setting an optical frequency difference in any combination of the plurality of optical beams in such a way as to be larger than a band of a photodetector that receives the optical beam.

Wavelength of a light source incorporated in or externally attached to the optical multiple-beam generation means 61 is swept at a predetermined cycle. An optical beam of which wavelength has been swept is caused to branch into a plurality of optical beams by a splitter. Since the wavelength is swept, a frequency differs between an optical beam and an adjacent optical beam. For this reason, in an instantaneous light intensity of interference light generated by interference between object light and reference light, a changing term appears as described according to the first example embodiment. According to the present example embodiment, the branching optical beams are made incident on the optical frequency difference setting means 62, and a delay is given among the beams by a delay device or the like. Since the wavelength is swept, when a delay is given, change in wavelength, i.e., change in frequency increases to that extent, and a frequency difference (beat frequency) between adjacent optical beams can be made larger than a band of a photodetector (not illustrated) that receives the optical beam. By adjusting given delay time, an optical frequency difference in any combination of the plurality of optical beams is set in such a way as to be larger than the band of the photodetector. This setting prevents influence of optical interference among a plurality of the object optical beams from appearing in photoelectric conversion output of the photodetector. The optical beams of which beat frequency has been set in such a manner are output and caused to branch into object light and reference light.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

For example, according to the above-described example embodiments, the splitter that causes output light of the light source to branch into three pieces is used, but the number of branching pieces is not limited to this. An effect of measurement acceleration is more enhanced as more branching is performed.

The light source that outputs light of a wavelength of a 1300 nm band is used in the above, but the wavelength is not limited to this.

Even in the case of different wavelengths such as a 1000 nm band and a 1550 nm band, the same effect as in the above example embodiment can be achieved.

According to the above-described example embodiments, the wavelength of the light source is linearly swept with respect to time, but may be corrected without linear sweeping. While interference light intensity data for equally spaced optical frequencies are used as the interference light spectrum in the SS-OCT to acquire structural data of a measurement target using Fourier transform on an interference light spectrum, linear sweeping can simplify data processing after acquisition of the interference light intensity data.

The invention has been particularly shown and described with reference to example embodiments as typical examples thereof. However, the invention is not limited to these embodiments. In other words, it will be understood by those of ordinary skill in the art that various changes in form and details may be made therein without departing from the spirit and scope of the present invention as defined by the claims.

This application is based upon and claims the benefit of priority from Japanese patent application No. 2017-248229, filed on Dec. 25, 2017, the disclosure of which is incorporated herein in its entirety by reference.

REFERENCE SIGNS LIST

11 Measurement object
12 Irradiation optical system including scan mirror and lens
13 Collimator
14 Collimator
15 Reference light mirror
21 Light source
22 Spectroscope
31 Wavelength-sweep light source
32 Balanced photodetector
41 Splitter
42 Branching-merging device
101 Splitter
102 Delay device
103 Circulator
104 Branching-merging device
105 Branching device
106 Circulator
107 Branching-merging device
108 Circulator
109 Optical switch
110 Collimator

The invention claimed is:

1. An optical interference tomographic imaging device comprising:
    a multiple-beam generator configured to generate a plurality of wavelength-swept optical beams;
    an optical frequency difference setter configured to set an optical frequency difference in any combination of the plurality of wavelength-swept optical beams in such a way as to be larger than a band of a photodetector;
    an optical beam controller including an irradiation optical system configured to irradiate the plurality of wavelength-swept optical beams at different positions of an object to be measured by the optical interference tomographic imaging device, respectively;
    a branching device configured to branch a plurality of optical beams from the optical beam controller into a plurality of object light beams and a plurality of reference light beams;
    an interferer configured to interfere an object light scattered by the object with a reference light,
    first circulators connected to outputs of the branching device;
    an irradiation optical unit that irradiates the object to be measured with the object light from the first circulators;
    a branching-merging device to which the object light scattered by the object to be measured is input via the first circulators;
    second circulators connected to the outputs of the branching device:
    a reference light mirror to be irradiated with the plurality of reference light beams from the second circulators; and
    the photodetector which receives interference light generated by the scattered object light and the reference light reflected from the reference light mirror interfering with each other at the branching-merging device,
    wherein an optical path length of the object light from the branching device to the interferer and an optical path length of the reference light from the branching device to the interferer are equal.

2. The optical interference tomographic imaging device according to claim 1, wherein
    the optical frequency difference setter includes a delay device that generates a time difference among the plurality of optical beams output from the splitter, the time difference set in such a way that the optical frequency difference in any combination of the plurality of optical beams is larger than the band of the photodetector.

3. The optical interference tomographic imaging device according to claim 1, wherein a wavelength of wavelength-swept optical beam changes linearly with respect to time while the wavelength is swept.

4. The optical interference tomographic imaging device according to claim 1,
    wherein the irradiation optical system comprises a plurality of optical switches and collimators which correspond to the optical switches.

* * * * *